United States Patent [19]

Mattioli et al.

[11] 3,959,243

[45] May 25, 1976

[54] METHOD FOR PREPARING ALPHA-OLEFIN POLYMERS

[75] Inventors: Franco Mattioli, Terni, Italy; Oliviero Guanciale, deceased, late of Terni, Italy, by Eufrasia Fortunata Di Scenna Guanciale, heir

[73] Assignee: Montecatini Edison S.p.A., Milan, Italy

[22] Filed: Jan. 21, 1970

[21] Appl. No.: 4,464

Related U.S. Application Data

[63] Continuation of Ser. No. 701,555, Jan. 30, 1968, abandoned, which is a continuation-in-part of Ser. No. 393,812, Aug. 8, 1964, abandoned.

[52] U.S. Cl............................ 526/494; 526/500; 526/502; 526/123; 526/158; 526/351; 526/912
[51] Int. Cl.$^2$............................ C08F 6/00; C08F 6/28
[58] Field of Search ..................... 260/93.7, 94.9 F

[56] References Cited
UNITED STATES PATENTS

| | | | |
|---|---|---|---|
| 2,628,176 | 2/1953 | Simon et al. | 117/138.8 |
| 2,967,857 | 1/1961 | Pfeifer et al. | 260/94.9 |
| 3,070,588 | 12/1962 | Klink et al. | 260/94.9 |
| 3,183,202 | 5/1965 | Bard et al. | 260/32.6 |

*Primary Examiner*—Stanford M. Levin
*Attorney, Agent, or Firm*—Hubbell, Cohen, Stiefel & Gross

[57] ABSTRACT

Stabilizing polypropylene to thermal oxidation and ageing by treating polymeric slurry thereof with aqueous solution of a surfactant. Surfactant is fatty acid ester of condensation product of ethylene oxide and sorbitan.

4 Claims, No Drawings

METHOD FOR PREPARING ALPHA-OLEFIN POLYMERS

CROSS-REFERENCE TO RELATED APPLICATION

This application is a continuation of copending application Ser. No. 701,555, filed Jan. 30, 1968, now abandoned, which application is a continuation-in-part of application Ser. No. 393,812, filed Aug. 28, 1964, now abandoned.

BACKGROUND OF THE INVENTION

1. Field of the Invention

This invention relates to a method of preparing stable alpha-olefin polymers and more particularly to a method of preparing alpha-olefin polymers which are stable against thermal oxidation and ageing. Still more specifically, this invention is directed to stabilizing polypropylene by treating the polymerization slurry thereof with small but effective amounts of a surface-active agent consisting essentially of a fatty acid ester of the condensation product of ethylene oxide and sorbitan. The invention is also directed to the stabilized polymers produced by such treatment.

2. Description of the Prior Art

The alpha-olefin polymers and their method of polymerization are known. More specifically, alpha-olefins may be polymerized in the presence of catalysts consisting of at least one organometallic compound of a metal belonging to Groups I, II or III of the Periodic Table and a solid crystalline halide of a transition metal belonging to Groups IV, V or VI of the Periodic Table. In addition to the catalyst, there may be present during the polymerization an activating substance such as a pyridine, a phosphine, an amine, a bismuthine, and/or an ether. The monomer is usually introduced into a solvent which acts as a suspending agent for the polymerization product. These solvents are inert with respect to the catalyst which may be, e.g., an aluminum alkyl and a titanium trichloride. The polymerization is normally carried out for a period of time ranging from 10 to 100 hours at a temperature ranging from about 30° to 90°C under a pressure of 1–15 atmospheres. The slurry obtained at the end of the polymerization is then subjected to treatment with a purifying agent in order to reduce the ash content of the product. Subsequently, the slurry of polymer is treated with a surface-active agent and then stripped or centrifuged to remove the solvent.

SUMMARY OF THE INVENTION

It has now been discovered, quite unexpectedly, that polymers having a remarkable resistance to thermal oxidation and ageing can be obtained by adding to the polymeric slurry, during or after the stripping stage, a specific surface-active agent or its aqueous solution. This surfactant consist essentially of fatty acid esters of a condensation product of ethylene oxide and sorbitan. It has been found that this treatment is particularly effective in removing catalytic residues to thus reduce ash content and thereby stabilize the polymer. Moreover, it has been found that even small residual amounts of these surfactants make the polymers highly wettable, since these agents have high surface activity.

Any of the surfactants known by the trademark Tween may be used and include such compounds which are prepared by reacting ethylene oxide-sorbitan condensation products with fatty acids such as lauric acid, stearic acid, palmitic acid, oleic acid, myristic acid, arachic acid, erucic acid, behenic acid, pelargonic acid, ricinoleic acid, etc. Sorbitan can be characterized by formulae I and II:

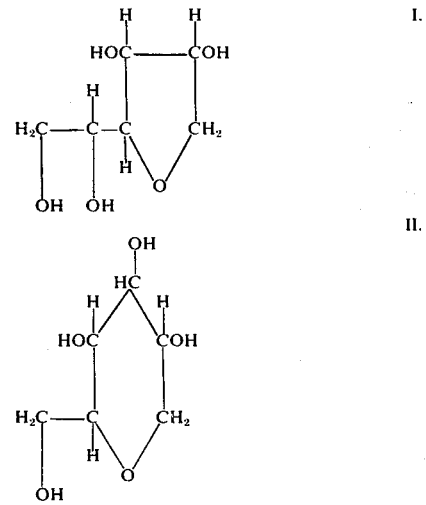

DESCRIPTION OF THE PREFERRED EMBODIMENTS

In a preferred embodiment the polymer is obtained in the form of a cake after clarification, stripping, and centrifuging the polymerization slurry. The polymeric cake is introduced into a stripper containing water and is subjected to steam so as to eliminate the polymerization solvent. When the solvent has been eliminated, the treatment of the present invention is performed by adding a fatty acid ester of an ethylene oxide-sorbitan condensation product to the mixture of the polymer and water. The relative weight ratio between the dry polymer and the water is about 1:2 with the weight ratio between the polymer and surfactant ranging between 1:0.00025 and 1:0.0025. This polymeric mixture is then centrifuged, washed and dried.

The polymers obtained by treatment with these condensation products are useful in various fields including the preparation of films, fibers, and other shaped articles. Particularly important is the treatment of isotactic polypropylene obtained by polymerizing propylene with a stereospecific catalyst as more specifically set forth in U.S. Pats. 3,112,300 and 3,112,301. Particularly interesting is the use of these treated polymers for the preparation of films to be used in the packaging of food stuffs and the like.

The following examples are presented to further illustrate the present invention and are not intended to limit the scope thereof.

EXAMPLE 1

The following compounds were introduced into a 1500 liter stainless steel autoclave:

| | |
|---|---|
| n-heptane | 600 liters |
| $Al(C_2H_5)_2Cl$ | 1100 g |
| $TiCl_3$ | 550 g |

The mixture was heated to 70°C and propylene was fed into the reactor and continued until about 975 liters of the monomer were absorbed. Polymerization was continued at 70°C for about 12 hours. The unreacted monomer was removed. Approximately 19.8 kg of n-butyl alcohol were added to the polymeric slurry and centrifuged until a purified cake of polymer was obtained. This cake was introduced into a 8,000 liter reactor (stripper) containing about 500 kg of water. The slurry was then agitated and steam was introduced so as to remove the polymerization solvent. About 1.237 kg of a monolaurate of an ethylene oxidesorbitan condensation product (Tween 20) was then added to the mixture. After centrifuging, the polymer was washed and then dried. The polymer obtained had the following characteristics:

| | |
|---|---|
| Intrinsic viscosity (determined in tetrahydronaphthalene at 135°C) | 1.52 (100 cc/g) |
| Ash content | 0.007% |
| (Ash content without Tween treatment | 0.025%) |
| Residue after heptane extraction | 96.2% |

Several small plates having a thickness of about 24 microns were prepared from the polymer obtained from Example 1. These plates were exposed in a ventilation oven at temperatures of 120°C. After about 18 days of exposure they were found to be brittle. Similar plates prepared from the polymer containing various known surface-active agent were found to be brittle after a period of 12–15 days. More specifically, in those cases where the polymer was treated with an ethylene oxidestearic acid condensation product it was found that they had become brittle after 12 days of exposure to the oven heat. Likewise, where the polymer was treated with an ethylene oxide-octylphenol condensation product. The samples were found to be brittle after about 15 days of exposure. Thus, it is seen that the polymeric samples treated with the fatty acid ethylene oxide-sorbitan condensation product of this invention were substantially better than the corresponding polymeric compositions treated with other known surfactants at temperatures of about 120°C.

EXAMPLE 2

Approximately 600 liters of n-heptane, 1,100 g of aluminum diethyl monochloride and 500 g of TiCl$_3$ were introduced into a 1,500 liter stainless steel autoclave. After heating to about 70°C, propylene was fed until approximately 975 liters of the monomer were absorbed. Polymerization was carried out for about 12 hours at 70°C. The non-polymerized monomer was removed and recovered. The polymerization slurry was then mixed with about 19.8 kg of n-buty alcohol for purposes of clarifying the slurry and then centrifuged. The polymeric cake was introduced into a 8,000 liter reactor (stripper) which contained about 500 kg of water. The slurry was agitated and steam was introduced in order to remove any of the polymerization solvents. About 0.0825 kg of a monopalmitate of a sorbitan-ethylene oxide condensation product (Tween 40) was then fed into the mixture. After centrifuging, the polymer was washed and dried. The product obtained had the following characteristics:

| | |
|---|---|
| Intrinsic viscosity | 1.52 |
| Ash content | 0.005% |
| (Ash content without Tween treatment | 0.020%) |
| Residue after heptane extraction | 97.5% |

Several laminates having a thickness of about 25 microns were prepared from the polymeric composition of Example 2. After about 17½ days of exposure in an oven provided with air circulated at 120°C, these laminates became brittle.

EXAMPLE 3

The following reactants were introduced into a 1,500 liter stainless steel autoclave:

| | |
|---|---|
| n-heptane | 600 liters |
| AlEt$_2$Cl | 1,100 g |
| TiCl$_3$ | 550 g |

The entire mixture was heated to 70°C and propylene was then fed into the reactor. The feed was continued until about 975 liters of the monomer were absorbed. The polymerization was carried out for about 13 hours at 70°C. The non-polymerized monomer was removed and recovered. The polymerization slurry was then mixed for purposes of clarification with about 19.8 g of n-butyl alcohol and then centrifuged. The polymer cake was subsequently introduced into an 8,000 liter reactor (stripper) which contained about 660 kg of water. The slurry was agitated and steam was introduced so as to remove any of the polymerization solvent. About 0.4125 kg of a monovoleate of a sorbitan-ethylene oxide condensation product (Tween 80) was introduced into the reactor. After being centrifuged, the polymer had the following characteristics:

| | |
|---|---|
| Intrinsic viscosity | 2.02 |
| Ash content | 0.005% |
| (Ash content without Tween treatment | 0.018%) |
| Residue after heptane extraction | 97.3% |

While this invention has been described with respect to a number of specific embodiments, it is obvious that there are many other modifications and variations which can be made without departing from the spirit and scope of the invention.

Having thus described our invention, what we desire to secure by Letters Patent and hereby claim is:

1. In a method of stabilizing polypropylene, prepared in the presence of a catalyst consisting of at least one organometallic compound of a metal belonging to Groups, I, II or III of the Periodic Table and a solid crystalline halide of a transition metal belonging to Groups IV, V or VI of the Periodic Table, against thermal oxidation and ageing by removing residue of said catalyst from said polypropylene, the improvement which comprises effecting said removal by dispersing in an aqueous slurry of said polypropylene a surfactant selected from the group consisting of polyoxyethylene (20) sorbitan monolaurate, polyoxyethylene (20) sorbitan monopalmitate and polyoxyethylene (20) sorbitan monooleate and thereafter separating the polypropylene from said slurry.

2. The method of claim 1, wherein said aqueous slurry of polypropylene is obtained by stripping a polymerization slurry thereof to remove the polymerization solvent, said surfactant is then added, and the resulting mixture is then centrifuged and the polypropylene subsequently washed and dried.

3. The method of claim 1, wherein the relative weight ratio of polypropylene to the surfactant ranges between about 1:0.00025 and 1:0.0025.

4. The method of claim 1, wherein said surfactant is polyoxyethylene (20) sorbitan monooleate.

\* \* \* \* \*

PO-1050
(5/69)

UNITED STATES PATENT OFFICE
CERTIFICATE OF CORRECTION

Patent No. 3,959,243          Dated May 25, 1976

Inventor(s) Franco Mattioli et al

It is certified that error appears in the above-identified patent and that said Letters Patent are hereby corrected as shown below:

Column 1, line 40: "trichlo ride" should read -- trichloride --.

Column 3, line 35: "product. The" should read -- product the --; line 52: "n-buty" should read -- n-butyl --.

Column 4, line 27: "monovoleate" should read -- monooleate --.

Signed and Sealed this

Twenty-seventh Day of July 1976

[SEAL]

Attest:

RUTH C. MASON
Attesting Officer

C. MARSHALL DANN
Commissioner of Patents and Trademarks